_United States Patent Office_

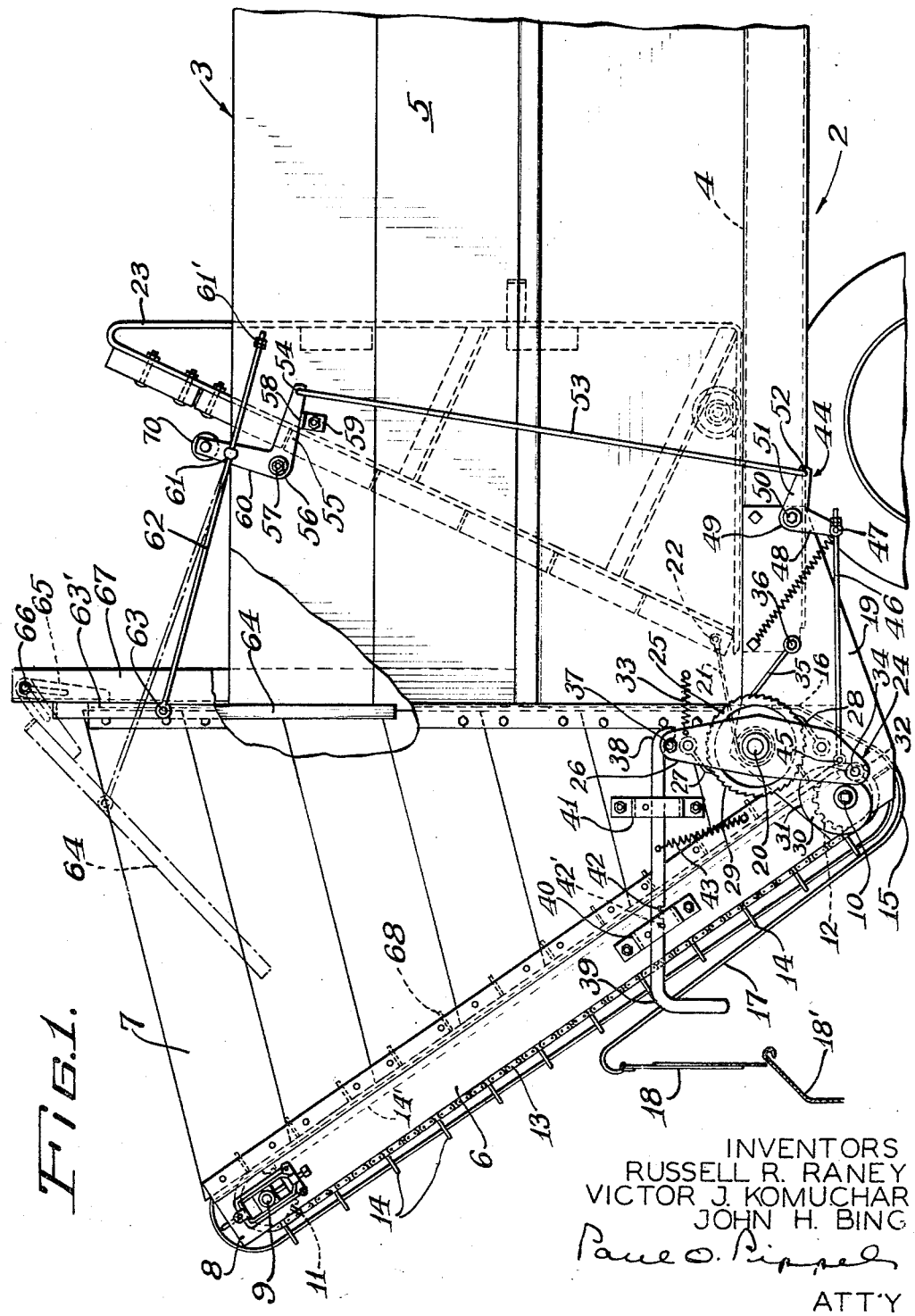

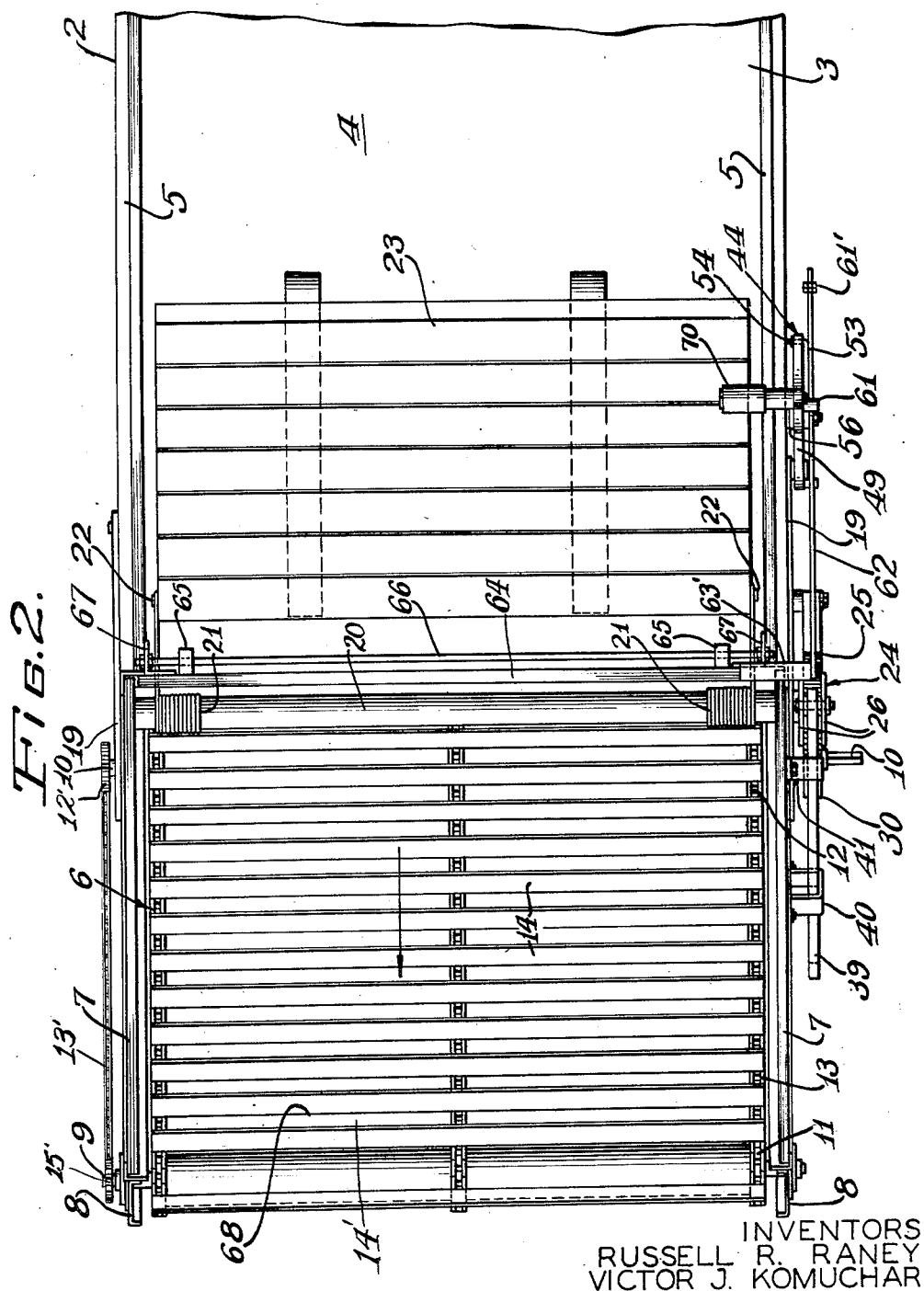

2,704,166
Patented Mar. 15, 1955

2,704,166

SELF-UNLOADING WAGON

Russell R. Raney, Western Springs, Victor J. Komuchar, Brookfield, and John H. Bing, Downers Grove, Ill., assignors to International Harvester Company, a corporation of New Jersey Application December 17, 1952, Serial No. 326,402

7 Claims. (Cl. 214—519)

This invention relates to self-unloading vehicles and more particularly to a farm wagon especially adapted for unloading silage.

A general object of the invention is to devise a rugged and efficient self-unloading wagon incorporating means for controlling the volume of discharge at a substantially uniform rate.

A more specific object of the invention is to devise such a self-unloading wagon wherein the rear end of the wagon is provided with an overshot conveyor in the form of a rearwardly and upwardly discharging elevator and a swinging control gate is interposed between the elevator and the load in the wagon, the control gate being associated with linkage for stopping rearward discharge from the wagon to the elevator whenever an overload develops while the elevator continues in operation.

A further object of the invention is to organize the control linkage and the wagon discharging means in such a manner that when the wagon is empty the control linkage will be actuated to stop the wagon unloader.

These and other objects of the invention will become more apparent from the specifications and the drawings wherein:

Figure 1 is a fragmentary side elevational view partly broken away of the rear portion of a wagon corporating the invention; and Figure 2 is a fragmentary plan view of the structure shown in Figure 1.

Describing the invention in detail, the wagon generally designated 2, may be of any conventional construction and may comprise a box 3, having the usual bottom 4 and spaced sides 5, 5, and a closed front (not shown). The wagon may have an open rear end and across the rear end is positioned an upwardly, rearwardly inclined scraper elevator conveyor 6, fitted between the rear extremities a pair of triangular rearward extension members 7, 7 connected at their forward ends to the respective sides 5, 5, of the box.

The conveyor 6, may comprise a beam 8 at each side through which may be journalled upper and lower cross-shafts 9 and 10 carrying sprockets 11 and 12, respectively, about which may be trained an endless chain type conveyor belt 13, incorporating a series of laterally spaced scraper slats 14, which are adapted to dig into the load and carry it over the top end of the elevator conveyor 6 over a paneling 14' extending between beams 8. It will be understood that the shaft 10 constitutes a drive shaft and that the sprockets 12 idle freely on this shaft. A sprocket 12' is keyed to shaft 10 and drives a chain 13' driving sprocket 15' keyed to shaft 9 to which sprockets 11 are keyed whereby the drive is transmitted to the conveyor apron 13.

It will be seen from the consideration of Figure 1, that the lower forward end of the overshot conveyor 8, is disposed beneath the wagon bottom 4 within a trough 15, which may be formed of sheet metal and may be connected at its forward edge to the rear end of the wagon bottom framework 4, as shown at 16. The trough member 15, may continue beneath and under the rear side of the conveyor 8, as in upward, rearward extension 17, generally paralleling the back side of the conveyor 8 to an area approximately intermediate its ends, where it may be provided with a dependent swingable flap 18, which may fit or swing over a side 18' of a conventional blower conveyor such as shown in U. S. Patent 2,555,558, in order to prevent spillage upon the ground.

The rear end of the wagon body may be provided with a gusset plate 19 at each side thereof and the gusset plates may support or rotatably journal a cross-shaft 20 to which may be attached a pair of cables 21, 21 or chains which may be extended along the bottom 4, and at their other ends connect as at 22 to opposite sides of a false end gate or unloader 23, which is adapted to be positioned at the forward end of the wagon when the wagon is empty and to be slid along the bottom 4 rearwardly to discharge the load in the wagon, the gate 23 extending across the width of the wagon between the sides 5, 5 and being movable rearwardly pursuant to rotation of the shaft 20 while winding on the cables or chains 21 thereabout as hereafter further explained.

The shaft 20 mounts a pawl and ratchet wheel actuating assembly or variable transmission generally indicated 24 and comprising a ratchet wheel 25 keyed to the shaft 20 and disposed between a pair of operating links or arms 26, 26 rotatably journalled about the shaft 20. The links 26, 26 carry pawls 27 and 28 spring-biased into engaging relationship with the teeth 29 of the ratchet wheel.

It will be noted from a consideration of Figure 2 that the links 26, when they are rotated in a counterclockwise direction, actuate or drive the ratchet wheel 25 in a counterclockwise direction and thus also the shaft 20 and thereby wind on the cable 21, thus advancing the end gate toward the rear and thereby discharging the load to the elevator conveyor 8.

The driving assembly 24 is actuated by means of a cam 30 which is keyed to the shaft 10, said shaft 10 being suitably keyed to a drive or power source for the associated blower such as shown in U. S. Patent 2,555,558. Thus it will be understood that the shaft 10 is constantly rotating and driving the cam 30. The cam 30 has a suitable profile 31 to cause step by step rocking of the linkage 26 through the medium of a cam follower or bearing surface 32 riding on the profile 31 and biased into engaging relationship therewith through the medium of a spring 33, the follower 32 being journalled on a pin 34 mounted on the lower ends of the links 26, and the spring 33 having one end hooked to the upper ends of links 26 and to the side 5 of the box and arranged to pull the linkage 26 in clockwise direction by exerting a pull on the upper end of the linkage to the right as shown in Figure 1, the spring being hooked at its far end with respect to the linkage 26, to the wagon at a point to the right of said linkage.

A one way detent member 35 is pivoted to the wagon or more specifically to the adjacent side gusset plate 19 as at 36 and is spring loaded into engaging relationship with the teeth of the ratchet, the detent 35 being in the nature of a pawl for preventing the ratchet from being pulled back accidentally in the reverse direction to that intended.

The upper ends of the levers 26, 26 are interconnected by a cross-pin 37 which is adapted to be engaged in a lost-motion connection by a depending hook portion 38 of a manual lock out means in the form of a combination bolt and handle member 39 extending rearwardly and loosely supported in suitable brackets 40 and 41 at longitudinally spaced points, the brackets being carried by the adjacent panel 7 and the bolt being provided with a plurality of serrations 42 on its bottom side, which gravitationally and by the spring 43' are adapted to engage a pin 42' on the bracket 40 in order to lock the member 39 in adjusted location longitudinally of the wagon. It will be appreciated that the hook portion 38 of the member 39 is adapted to pass around the forward side of the pin 37 and that the lock may be pulled rearwardly thus rotating the linkage 26, 26 in a counterclockwise direction and, depending upon the distance of such rotation, either completely disengaging the cam follower 32 from the cam profile 31 or limiting the area of engagement so that partial actuation of the ratchet wheel 25 is obtained whereby controlling the extent of actuation of the unloader and thus the rate of discharge of the forage in the wagon or completely stopping the discharging operation. The manual control link 39 is normally pulled to the rearwardmost position, that is, to the left as shown in Figure 1, in order to completely disengage the transmission 24 from the cam during transport, and normally is disposed in neutral position, that is as far to the right as possible as shown in Figure 1, to disengage it from the drive means 24 when the wagon is being unloaded.

The lower ends of the links 26 are associated with volume regulating means, generally designated 44, and constituting a pin 45 connected to said lower ends of links 26 and affording a pivot for one end of a pull rod 46, the other end of the pull rod extending forwardly of the wagon, to the right in Figure 1, and having a pivotal lost-motion connection as at 47 to a depending bell crank arm 48 of a bell crank lever 49 pivoted as at 50, at its elbow, from the side of the adjacent wagon gusset plate 19. The bell crank has a forwardly downwardly angled arm 51 connected at its outer end pivotally as at 52 to the lower end of an upright pull rod 53, which at its upper end is pivoted as at 54 to the outer end of a lower forwardly projecting leg 55 of a bell crank 56 pivoted at its elbow as at 57 from the adjacent side of the wagon 5, the lower edge of the leg 54 seating in normal rest position as at 58 on a lug or stop 59, fastened to the side of the wagon 5. The bellcrank lever 56 has an upstanding leg 60, which has a pivotal lost-motion connection as at 61 to one end of a pull rod 62, which at its other end extends upwardly rearwardly and is pivotally connected as at 63 to a bracket 63' fastened to the upper part of a swinging control means in form of a gate or flap 64 which is pivotally hung from a pair of hinge members 65, 65 on a cross-bar 66 carried by frame brackets 67 extending over the top of the wagon and connected to the sides 5, 5.

The gate or flap 64 extends the full width of the box between the sides 5, 5 and at its lower edge terminates approximately halfway to the bottom of the box.

The assembly as just described constitutes a volume control or governor means and functions as follows:

The drive shaft 10, which rotates in a counterclockwise direction Figure 1, rotates the cam 30 in the same direction and the cam causes step-by-step operation of the transmission 24 as heretofore described. Operation of the linkage 24 drives the shaft 20 and in turn causes the end gate 23 to advance rearwardly and discharge the load through the open end of the box against the active run 68 of the elevator conveyor which, moving in the direction of the arrow as shown in Figure 2, discharges the load over the top of the conveyor 6 and into the trough 18' of the blower mechanism. An overload engages the forward side of the valve gate 64 and swings the same toward the left (Figure 1) whereby pulling the pull rod 62 to the left and rotating the bell crank lever 56 in a counterclockwise direction whereupon pulling the rod 53 upwardly and rotating the bell crank 49 in a counterclockwise direction and pulling the rod 46 to the right and thus rotating the links 26, 26 in a counterclockwise direction and disengaging the cam follower 32 from the cam profile 31 either partially or wholly depending upon the degree of swing back of the gate 64. Inasmuch as the connection at 47 is of a lost-motion type, if the follower 32 is not withdrawn completely from the path of the profile 31, a limited actuation of the driving mechanism 24 is available consistent with the disposition of the driving mechanism 24 in relation to the cam 30.

When the tail gate 23 is moved to rearwardmost intended position, that is when the wagon is completely discharged, the upper part of the tail gate is adapted to engage roller abutment 70 which will rotate the lever 57 in the same manner as rearward swinging of the gate 64 and this movement will continue until complete disengagement between the follower 32 and the cam 31 is obtained. The tail gate will not be disturbed in view of the lost motion connection 61 between the lever 56 and the pull rod 62, the connection 61 being adjustable by relocating the nuts 61' or rod 62.

It will be appreciated from the preceding detailed description that a novel control is afforded for discharge of the material such as may be readily adjusted and regulated and which is completely responsive to the overloads so that the uniform discharge is readily available. The flap further serves to rake over the run 68 of the elevator conveyor to level the discharging load as best seen in phantom lines in Figure 1.

To return endgate to loading position pawls 27 and 28 and detent 35 are disengaged and the gate 23 is drawn to the head of the wagon box manually.

What is claimed is:

1. The combination with a vehicle having a wheel supported frame, a body carried by said frame and having an open end, a shaft supported at the open end of the body, a conveyor assembly mounted within the body and operatively connected with said shaft; of means for imparting a step-by-step movement to said conveyor assembly toward the open end of the body to unload the same, said means comprising a ratchet wheel connected to said shaft, a power driven elevator conveyor drive shaft adjacent said first-mentioned shaft, a cam on the second-mentioned shaft, an arm pivotally supported on said first-mentioned shaft and operatively engaged with the cam, a pawl carried by the arm and engaging said ratchet wheel to turn the ratchet wheel upon movement of said arm by the cam, an elevator conveyor supported across the open end of the body and extending diagonally upwardly therefrom and operatively associated with said second-mentioned shaft and driven thereby to discharge over its upper end, and discharge regulating means comprising a member swingably mounted across the upper part of said open end of the body in intercepting relationship to the load as it is being discharged from said body for movement thereby under conditions piling the load beyond a predetermined limit at said open end, and movement transmitting means operatively interconnecting said member with said arm for disengaging the arm from the cam and thereby temporarily stopping said conveyor assembly upon said member being moved a predetermined distance until the load accumulation is removed by said elevator conveyor whereby accommodating swing-back movement of said member and reengagement of said arm with the cam for continued operation of said conveyor assembly.

2. A vehicle comprising a frame, a body carried thereby and having an open end, a stripper conveyor mounted to the body across the open end thereof and extending diagonally upwardly away therefrom and having its lower end adjacent to the bottom of the body, means cooperatively associated with the body for moving the load toward said open end against said stripper conveyor, driving means for driving said conveyor in a direction to discharge over its upper end, transmission means operatively connecting the driving means with said first-mentioned means for operating the latter, a flap member swingably mounted from the body across the upper portion of said open end and spaced from the bottom of the body for accommodating unrestricted movement of the load through the space beneath the lower extremity of the member toward said conveyor and movable by any discharging load portion from the body higher than the depth of said space, and means connecting said member with said transmission means for disengaging the latter from said driving means upon predetermined movement of said flap member toward said conveyor by the overload, said conveyor in the swing-back position of said flap member extending therebeneath and adapted to cause attrition of the load thereabove to accommodate return of said flap member whereupon reestablishing, through actuation of said connecting means, engagement of said transmission means for operating said first-mentioned means.

3. In an unloading arrangement for a wagon comprising a box with an open end and unloading means in the box for discharging a load within the box through said open end, a scrapper elevator conveyor mounted on the box across the open end, driving means operatively associated with the conveyor for continuous operation thereof, variable transmission means operatively interconnecting said driving means with said unloading means, said variable transmission means conditionable to establish varying drive between said driving means and said unloading means and disengageable from the driving means to stop operation of said unloading means, a combination gate and rake member movably suspended from said box across said open end between the load and said conveyor, said member having a path of movement from said box over said conveyor in raking relationship to the load thereupon and movable by a load of over a predetermined limit in a direction toward the conveyor and movable to its initial position when the load is below said limit, and operating linkage interconnecting said member and said variable transmission means and responsive to the movement of said member to effect predetermined corresponding conditioning of said transmission means.

4. The combination according to claim 3 and said unloading means and said linkage having cooperative abutments engageable upon predetermined movement of said unloading means for operating the linkage to disengage said transmission means and stop said unloading means.

5. In an unloading arrangement for a vehicle box having an open end, a scraper elevator conveyor mounted on the box across said open end and inclined upwardly away therefrom and presenting an upwardly and rearwardly moving run facing into said box, unloading means within the box for discharging a load from the box through said open end against said conveyor run, a control gate pivotally suspended from the box across said open end and having a lower edge spaced above the bottom of the box and in normal rest position extending generally vertically, said gate swingable toward said conveyor in an arc such that the lower edge of the gate is positioned over said conveyor run in scraping relationship to the load thereon to generally equalize the discharge of the load from said conveyor.

6. In an unloading arrangement for a vehicle box having an open end, a scraper elevator conveyor mounted on the box across said open end and inclined upwardly away therefrom, unloading means within the box for discharging a load from the box through said open end against said inclined conveyor, a control gate pivotally suspended from the box across said open end and having a lower edge spaced above the bottom of the box and in normal rest position extending generally vertically in a plane intersecting the lower bottom edge of the conveyor, said gate swingable toward said conveyor in an arc such that the lower edge of the gate is moved a predetermined distance to the conveyor in scraping relationship to the load thereon to obtain a substantially uniform discharge from said conveyor, and means for continuously driving said conveyor, disengageable variable adjustable transmission means interconnecting said conveyor and unloading means for driving the latter, and means interconnecting said gate with said transmission means for adjusting said transmission in accordance with the position of the gate.

7. In a vehicle having a body with an open end; a shaft supported at the open end of said body, a conveyor assembly mounted within said body and operatively connected to said shaft; means for imparting a step-by-step movement of variable length to said conveyor assembly toward the open end of said body to unload the same at varying rates, said means comprising a ratchet wheel connected to said shaft, an arm pivotally supported on said shaft and having a bearing surface at one side of its axis of pivot, a pawl carried by said arm and cooperatively associated with said ratchet wheel for imparting rotative movement thereto in accordance with the pivotal stroke of said arm, a rotary drive including a cam having a profile cooperatively associated with said bearing surface for pivoting said arm, said arm having a position whereat said bearing surface is engaged with said cam profile at all times to obtain a maximum length of stroke of said arm and said arm having other positions whereat said surface is engaged with only part of said profile or disengaged therefrom whereat said arm is respectively moved less than said length of stroke or immobilized, automatic means for regulating the length of stroke of said arm comprising a member movably mounted across the upper part of said open end of the body in intercepting relationship to the load as it is being discharged from said body for movement thereby under conditions piling the load beyond a predetermined limit at said open end, an operating linkage interconnecting said member with said arm for moving said arm to said other of said positions in accordance with the movement of said member by said load; and adjustable means operatively associated with said arm for moving it to said other of said positions independently of said automatic means.

References Cited in the file of this patent
UNITED STATES PATENTS

| Number | Name | Date |
|---|---|---|
| 2,290,950 | Duncan | July 28, 1942 |
| 2,431,000 | Step | Nov. 18, 1947 |
| 2,434,718 | Recker | Jan. 20, 1948 |
| 2,511,246 | Chamberlin | June 13, 1950 |
| 2,599,741 | Bishman et al. | June 10, 1952 |
| 2,601,618 | Kringle | June 24, 1952 |
| 2,606,677 | Snedeger | Aug. 12, 1952 |
| 2,669,368 | Kammueller et al. | Feb. 16, 1954 |
| 2,676,721 | Hansen | Apr. 27, 1954 |